(12) United States Patent
Eriksson et al.

(10) Patent No.: US 7,426,321 B2
(45) Date of Patent: Sep. 16, 2008

(54) OPTICAL MODULATOR AND A METHOD FOR ADAPTING AN OPTICAL MODULATOR

(75) Inventors: Urban Eriksson, Bromma (SE); Robert Lewén, Tyresö (SE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/549,952

(22) PCT Filed: Mar. 12, 2004

(86) PCT No.: PCT/SE2004/000368

§ 371 (c)(1),
(2), (4) Date: Sep. 25, 2006

(87) PCT Pub. No.: WO2004/083952

PCT Pub. Date: Sep. 30, 2004

(65) Prior Publication Data

US 2007/0009195 A1 Jan. 11, 2007

(30) Foreign Application Priority Data

Mar. 21, 2003 (SE) .................................. 0300774

(51) Int. Cl.
  *G02F 1/035* (2006.01)
  *G02F 1/01* (2006.01)
  *G02F 1/03* (2006.01)
  *G02F 1/07* (2006.01)

(52) U.S. Cl. ............................... 385/2; 385/1; 359/245

(58) Field of Classification Search .................. 385/2
See application file for complete search history.

(56) References Cited

U.S. PATENT DOCUMENTS

| 4,380,364 | A | * | 4/1983 | Marcatili | 385/40 |
| 4,468,086 | A | * | 8/1984 | Liu | 385/9 |
| 4,553,810 | A | * | 11/1985 | Alferness et al. | 385/41 |
| 6,310,700 | B1 | * | 10/2001 | Betts | 359/2 |
| 2003/0147574 | A1 | * | 8/2003 | Lam et al. | 385/1 |

OTHER PUBLICATIONS

N. Dagli, et al. "Ultra Wide Electrical Band Width GaAS", 1995 IEEE MIT-S Digest, pp. 251-254.

* cited by examiner

*Primary Examiner*—M. R. Connelly-Cushwa
*Assistant Examiner*—Kajli Prince
(74) *Attorney, Agent, or Firm*—Workman Nydegger (57) ABSTRACT

The present invention relates to an optical modulator, divided into at least two active segments separated by at least one passive segment. The modulator comprises: an optical waveguide with an optical group index $n_o$ having an optical signal propagating at an optical velocity $v_o$, and a microwave transmission line with an electrical propagation index $n_p$, having an electrical signal propagating at an electrical velocity $V_e$. The electrical propagation index $n_p$ of the unloaded microwave transmission line is lower than the optical group index $n_o$ of the optical waveguide. The loading and length of the microwave transmission line are adjusted for a specific Bloch impedance and electrical velocity $v_e$. The invention also relates to a method for adapting the impedance of an optical modulator.

14 Claims, 8 Drawing Sheets

Fig. 1 (Prior Art)

Fig. 2a (section A-A)

Fig. 2b (section B-B)

OPTICAL MODULATOR AND A METHOD FOR ADAPTING AN OPTICAL MODULATOR

TECHNICAL FIELD

The present invention relates to an optical modulator, more specifically a travelling wave optical modulator, as defined in the preamble of claim 1. The invention also relates to a method for adapting the impedance in an optical modulator as defined in the preamble of claim 6.

BACKGROUND TO THE INVENTION

There are generally two types of light intensity optical modulators, electro-optic (EO) and electroabsorption modulators (EAM). The EO modulator is based on interferometry where the refractive index is controlled by applying an external field, usually implemented in form of a Mach-Zender Interferometer (MZI), disclosed in a textbook by Koichi Waikita with the title "Semiconductor optical modulators" published by Kluwer Academic Publisher in USA, 1998 which is hereby incorporated as a reference in its entirety. Electroabsorption modulators are usually based on band to band absorption controlled by an external field through the Frans-Keldych or quantum confined stark effect (QCSE).

The usual figure of merit (FOM) used for optical modulators includes weighting of device parameters as drive voltage ($V_{drive}$), electrical bandwidth (3 dBe), and DC load impedance ($Z_L$):

$$FOM = \frac{2 * Z_L}{50 + Z_L} f_{3dBe} \frac{\lambda}{1.55 \, \mu m} V_{drive}$$

Where $V_{drive}$ is the required voltage for a specified extinction ratio (ER), e.g. 10 dB or 20 dB for electroabsorption modulators, and $V_\pi$ for electro-optic modulators. The required ER should reflect the application the device is intended to be used in.

Electroabsorption modulators usually have a strong interaction between the electrical and the optical field and are therefore normally compact in size and show a low drive voltage. Therefore, the suggested FOM shows a clear advantage in favour for EAM. The compatible process for integration together with a laser, as well as the possibility to design with low polarization sensitivity can further motivate the use of an EAM. The electro-optic modulator does however show other advantages not included in this FOM such as well-defined non-linearity and controllable chirp.

Several EAM devices with an electrical bandwidth of more than 30 GHZ are presented in the Doctorial Dissertation by Robert Lewén, Royal Institute of Technology, Department of Microelectronics and Information Technology, Stockholm Sweden, publicly available 19 Jun. 2003, which is hereby incorporated as reference in its entirety.

In U.S. Pat. No. 6,160,654, by Kawano, an ultra high-speed semiconductor optical modulator with travelling wave electrode is disclosed, which has both advantages of a lumped-element electrode construction and a travelling wave electrode construction. A disadvantage with this construction is that the characteristic impedance of the electrical transmission line is relatively low, usually around 25Ω. Such low device impedance is usually not preferred within a standard microwave environment with a system impedance of 50Ω. Furthermore, this low impedance leads to a reduction of the suggested FOM (see above).

Another disadvantage with this construction is that the electrical and optical wave may propagate with different velocities. This effect will degrade the performance of the modulator.

Different approaches have been proposed to overcome the problems with low characteristic impedance and velocity matching. For electro-optical modulators one method, described in an article by R. G. Walker with the title "High-speed Semiconductor Intensity Modulators", published in IEEE Journal of Quantum Electron., vol 27, no 3, pp 654-667, 1991, is to divide the continuous modulator into several shorter active elements, in which the optical propagation constant is set by an electrical field given by the voltage of an applied control signal. This approach was originally proposed by U. Langmann and D. Hoffmann in a presentation at the International Microwave Symposium, Dallas, 1982, with the title "Capacity Loaded Transmission Line for Subpicosecond Stepped $\Delta \beta$ Operation of an Integrated Optical Directional Coupler Switch".

The active segments are separated by passive segments, in which the optical field is unaffected by the applied control voltage. The electrical transmission line is here implemented as loaded transmission line comprising a passive electrical transmission line implemented as an asymmetric co-planar line on the side of the optical waveguides, which are connected to several modulator segments, see FIGS. 1 and 2. The characteristic impedance of the co-planar line and the length of the modulator segments are adjusted to meet the requirements of velocity matching and preferred device impedance (usually 50Ω) according to design rules outlined in the article by Walker, see below.

Figure 1:
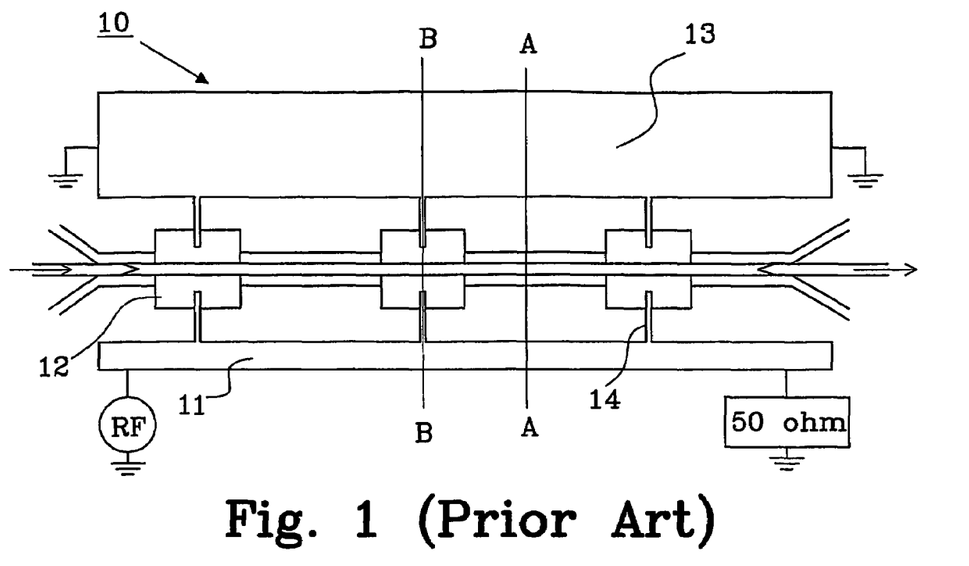
FIG. 1 shows a schematic view of a travelling wave Mach-Zender modulator according to prior art.
Figure 2A:
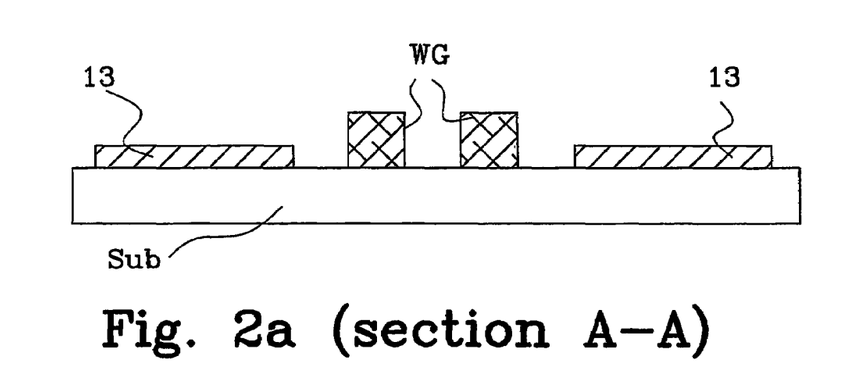
FIGS. 2a and 2b show cross-sectional views of the prior art modulator in FIG. 1.
Figure 2B:
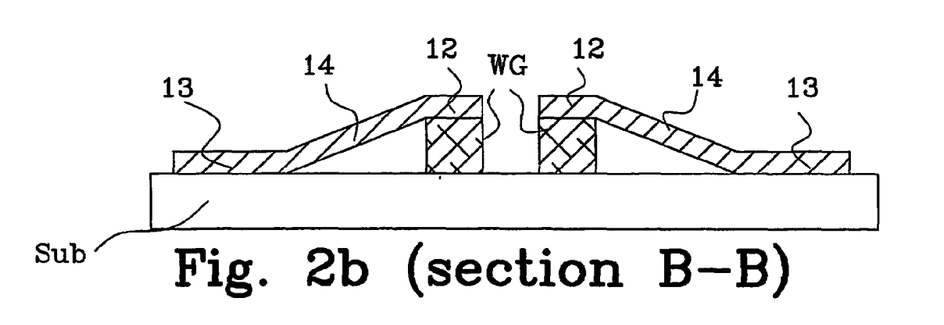

FIG. 1 shows a schematic of travelling wave Mach-Zehnder modulator 10 using a capacitively loaded co-planar passive microwave transmission line 11 and three-guide coupler split/recombine regions. The passive microwave transmission line (TML) 11, having the characteristic impedance $Z_p$ and propagation index $n_p$:

$$Z_p = \sqrt{\frac{L_p}{C_p}}, \text{ and } n_p = c_0 \sqrt{L_p C_p}, \tag{1}$$

where $L_p$ and $C_p$ is the inductance and capacitance per unit length of the TML, respectively. The passive waveguide is capacitively loaded by a number of modulator sections 12 each with a length $l_m$, a (centre to centre) spacing $l_s$, and a capacitance per unit length $C_m$. The device 10 further includes optical couplers, RF source and termination.

FIGS. 2a and 2b show cross-sectional views along A-A and B-B, respectively, in FIG. 1. FIG. 2a shows a cross-section of a passive section of the modulator according to Walker's design having two adjacent optical waveguides WG arranged on a substrate Sub, with a ground plane 13 arranged on one side of the waveguides WG and a transmission line TML arranged on the other side of the waveguides. FIG. 2b shows a cross-section of an active section of the of the modulator according to Walker's design having the same features as the passive section and an additional conductive bridge 14 between the transmission line 11, alternatively the ground plane 13, and each modulator section 12.

The resulting effective (Bloch) impedance and propagation index is then expressed as:

$$Z_B = \sqrt{\frac{L_p}{C_p + C_m \frac{l_m}{l_s}}}, \text{ and } n_B = c_0\sqrt{L_p\left(C_p + C_m\frac{l_m}{l_s}\right)}, \quad (2)$$

The optical and electrical velocity is matched ($n_B=n_0$) if (according to Walker):

$$C_m \frac{l_m}{l_s} = \frac{n_0^2 - n_p^2}{c_0^2 L_p} = \frac{n_0^2 - n_p^2}{c_0 Z_p n_p}. \quad (3)$$

Resulting in an effective (Bloch) impedance of:

$$Z_B = Z_p \frac{n_p}{n_B} = Z_p \frac{\sqrt{\varepsilon_{\it eff}}}{n_B}. \quad (4)$$

An alternative expression for (3) is then given as:

$$C_m \frac{l_m}{l_s} = \frac{n_B^2 - n_p^2}{c_0^2 L_p} = \frac{n_B^2 - n_p^2}{c_0 Z_B n_B} \quad (5)$$

EXAMPLE 1

A passive TML implementation, corresponding to Walker, as a co-planar strip on SI-InP (Semi-Insulating Indium Phosphide) having $\varepsilon_r=12.4$, $\varepsilon_{\it eff}=6.7$, and with $Z_B=50\Omega$ gives a characteristic impedance $Z_p=65\Omega$ and $C_m*l_m/l_s=95$ pF/m.

A typical $C_m$ for an electroabsorption modulator (EAM) is at least 700 pF/m, hence, $l_m/l_s<0.137$.

There are mainly four disadvantages with the implementation presented by Walker:

1) The passive (co-planar) transmission line is implemented on a substrate with a high dielectric constant, resulting in a high capacitance per unit length of passive transmission line. The total acceptable capacitance per unit length is however given by the impedance and velocity matching requirements. A higher capacitance of the transmission line leads to a lower acceptable loading with active modulator segments, i.e. lower duty cycle ($l_m/l_s$) between the active and passive optical waveguide sections. This is particularly a problem for an EAM due to a typically high $C_m$.
2) The implementation of the passive transmission line as a co-planar line is sometimes disadvantageous. This is, for example, the case when the semiconductor substrate below the modulator is conducting.
3) The connection between the passive co-planar line and the active modulator segments with capacitance $C_m$ has a parasitic inductance $L_s$. This parasitic inductance increases the total loading admittance:

$$Y_l = \frac{j\omega C_m}{1-\omega^2 L_s C_m} > j\omega C_m \quad (6)$$

An increased loading admittance leads to lower characteristic impedance and slower wave propagation.

4) The active segments only add capacitance to the passive transmission line, and there is no current transport through the active segments. Consequently, this implementation does not benefit from any inductive contribution from the active modulator segments.

To overcome the first disadvantage, a different approach was therefore suggested in the U.S. Pat. No. 6,310,700, by G. E. Betts, where the passive transmission line should be elevated and situated above the optical waveguide. The passive transmission line and the optical waveguide are separated by a layer having low dielectric constant. This could be a polyamide layer, where a part of this layer could be replaced by air, e.g. air bridges). The passive transmission line is then connected to the optical modulator segments using vertical vias, or conductive legs. This implementation decreases $\varepsilon_{\it eff}$, and leads to a higher duty cycle ($l_m/l_s$).

EXAMPLE 2

A TML implementation, corresponding to Betts, as a microstrip on BCB (Benzocyclobutene) having $\varepsilon_r=2.7$, $\varepsilon_{\it eff}\approx 2$, and with $Z_B=50\Omega$ gives a characteristic impedance $Z_p=119\Omega$ and $C_m*l_m/l_s=187$ pF/m.

A typical $C_m$ for an electroabsorption modulator (EAM) is at least 700 pF/m, hence, $l_m/l_s<0.27$.

The low value of $\varepsilon_{\it eff}\approx 2$ indicates that the passive waveguide, as implemented in example 2, should be designed with a characteristic impedance of $Z_p=119\Omega$. This high impedance level is however not practical. For example: a plated microstrip with a width of 6 µm and a plated height of 3 µm with a 7 µm thick BCB layer has in experiments by the inventors resulted in an impedance of $Z_p=75\Omega$. It is therefore not possible to reach 50Ω and velocity matching with this implementation according to the design rules proposed by Walker, see equations (1)-(5).

Betts approach improves the first disadvantage with the Walker design, as previously mentioned, and will also improve the second disadvantage by generalizing the implementation of the passive electrode to include other types of transmission lines besides the co-planar implementation suggested by Walker.

The third and fourth disadvantages with the Walker design are not improved by Betts.

Thus, there is a need for an improved electro-optical modulator that addresses these disadvantages.

SUMMARY OF THE INVENTION

A possible object of an embodiment of the present invention is to provide an optical modulator with an improved resulting effective impedance compared to prior art devices.

A possible solution to the object is achieved by the characterising features of claim 1.

Still another possible object of an embodiment the invention is to provide a method for adapting the impedance in an optical modulator with an improved resulting effective impedance compared to prior art devices.

A possible solution to the object is achieved by the characterising features of claim 6.

An advantage with the present invention is the problem with high impedance level in the passive waveguide is avoided.

An advantage with a first embodiment of the present invention is that the parasitic inductance found in the prior art is avoided.

An advantage with a second embodiment of the present invention is that the active segments make an inductive contribution to the passive transmission line.

DETAILED DESCRIPTION OF PREFERRED EMBODIMENTS

For some choices of implementation of the passive optical transmission line it can be difficult to manufacture transmission lines with sufficient high inductance per unit length to meet the requirements on device impedance and velocity matching. This may result in difficulties with respect to the manufacturing process or it may result in a transmission line with a high attenuation. Instead of increasing the inductance per unit length of the passive waveguide it may be advantageous to increase the length of the passive TML in relation to the optical waveguide. This implementation of transmission line is also referred to as a meandered transmission line.

Figure 3:
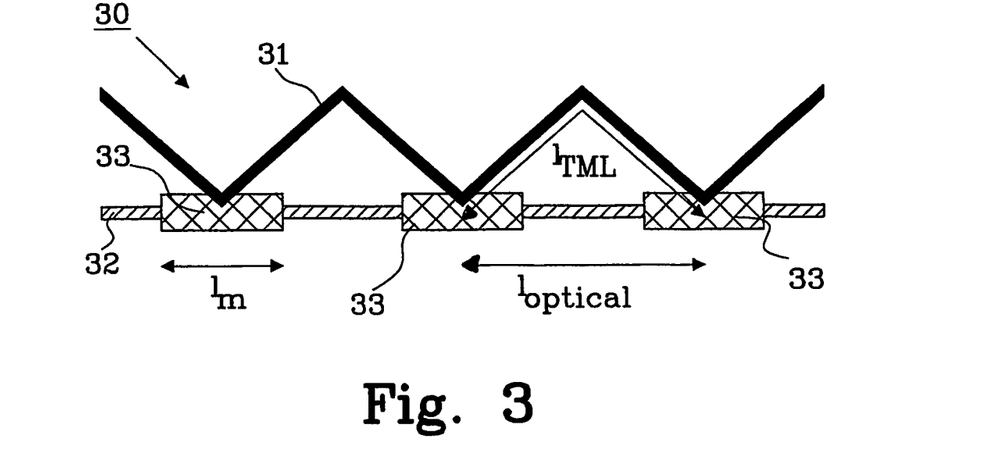
FIG. 3 shows an embodiment of a non-segmented implementation of a modulator according to the invention.

FIG. 3 shows a first embodiment 30 of an implementation where the electrical transmission line 31 is longer than the optical waveguide 32. The electrical transmission line is of a meandering type and mathematically this is described in the following way:

If the passive TML has an equivalent inductance per unit length $L_p$ and capacitance per unit length $C_p$, and each active modulator segment 33 has the capacitance $C_m$. Then the impedance of the loaded TML $Z_B$ is expressed as:

$$Z_B \sqrt{\frac{L_p l_{TML}}{C_p l_{TML} + C_m}} \tag{7}$$

And the effective propagation velocity along (normalized to) the optical waveguide $v_e$:

$$v_e = \frac{l_{optical}}{\sqrt{L_p l_{TML}(C_p l_{TML} + C_m)}} \tag{8}$$

Usually the capacitance contribution from the passive TML and the contribution from the modulator loading has the same order of magnitude ($C_p l_{TML} \approx C_m$). Therefore, increasing the length of the transmission line has the similar effect as increasing the inductance per unit length. The relative increase of the inductive contribution is higher than the relative increase of capacitive contribution.

By using a meandering transmission line, the modulator can be designed to simplify the manufacturing process.

By implementing the passive waveguide as a microstrip on BCB (see example 2), the low value of $\epsilon_{eff} \approx 2$ indicates that the passive waveguide should be designed with a characteristic impedance of $Z_p = 119\Omega$. From a manufacturing point of view it is preferable to keep the strip width wider than 6 μm. With a strip thickness of 1 μm the required BCB thickness is 16 μm and the resulting inductance is 560 nH/m. By using a meandered transmission line the BCB thickness may be reduced to 6 μm with $L_p \approx 400$ nH/m, which simplifies the manufacturing process.

Figure 4A:
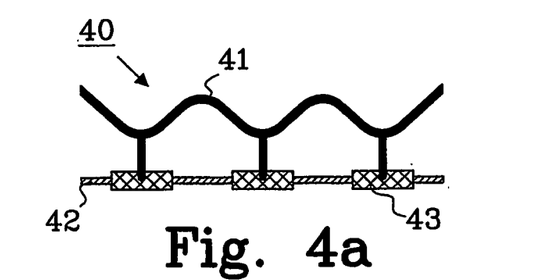
FIGS. 4a-4c show other embodiments of non-segmented modulators according to the invention.
Figure 4B:
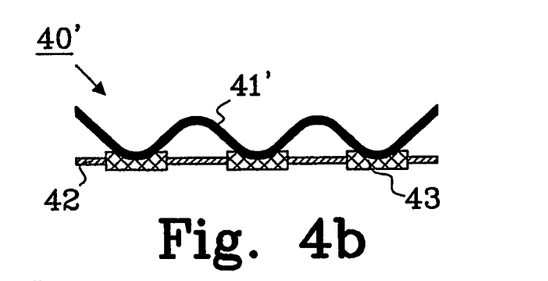
Figure 4C:
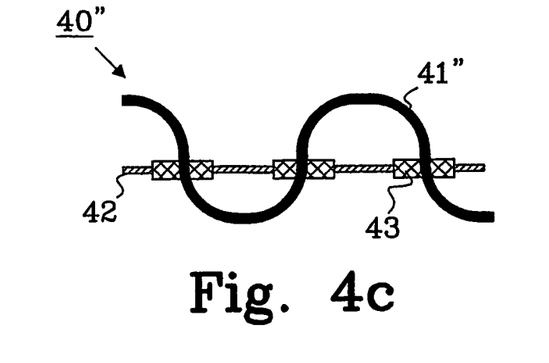

FIGS. 4a-4c show different embodiments where a longer passive transmission line 41, 41' and 41" is provided in relation to the optical waveguide 42.

A further improvement is to implement the modulator as part of the transmission line by allowing a current transport through the modulator segments in the direction of the optical light, as can be seen in FIGS. 5a-5f. This implementation can have two advantages compared to the design described by Walker. Firstly, any parasitic serial inductance in the connection (feedline) between the passive TML and the active modulator segments is avoided. Secondly, the inductance contribution offered by the active modulator segment is utilized. This improvement addresses the third and fourth disadvantage in the design guideline described by Walker.

Figure 5A:
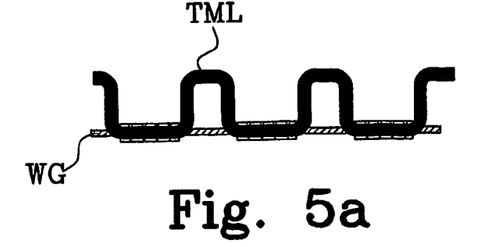
FIGS. 5a-5f show different embodiments of segmented or semi-segmented implementations of a modulator according to the invention.
Figure 5B:
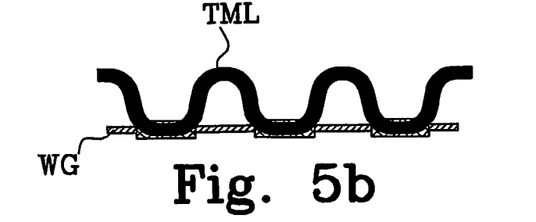
Figure 5C:
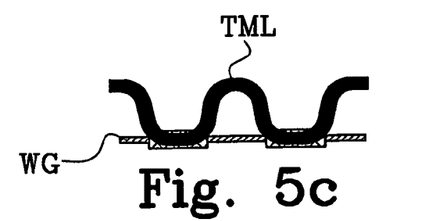
Figure 5D:
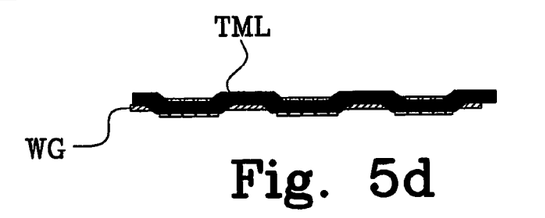
Figure 5E:
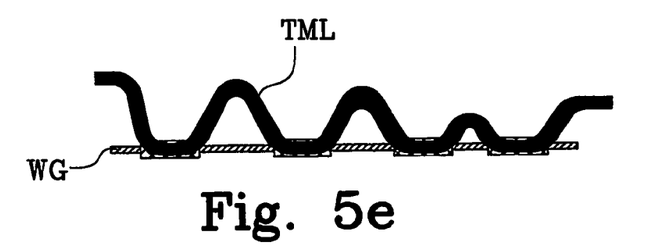
Figure 5F:
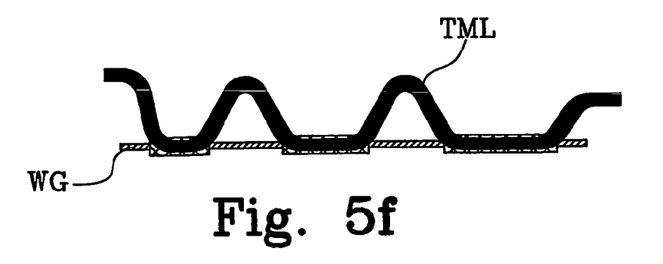
Figure 6A:
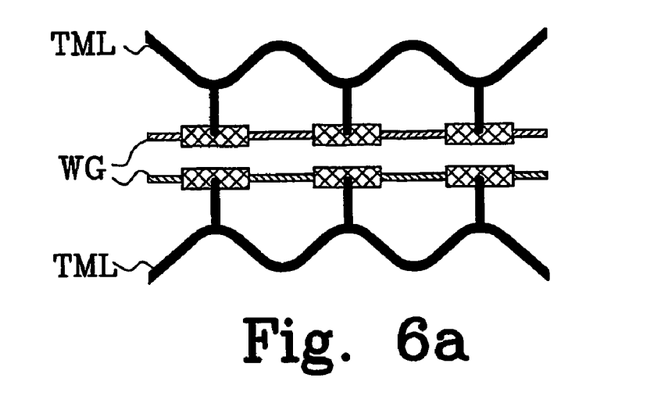
FIGS. 6a-6c show different embodiments of Mach-Zehnder implementations according to the invention.
Figure 6B:
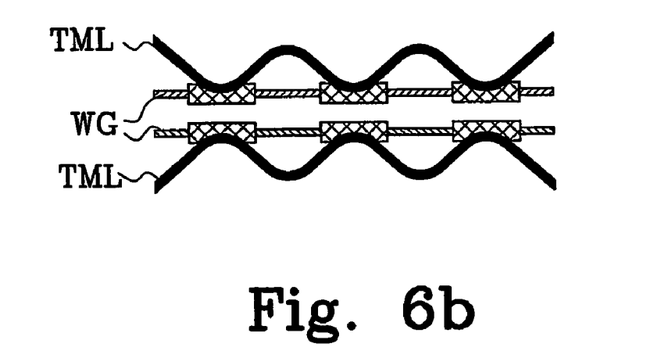
Figure 6C:
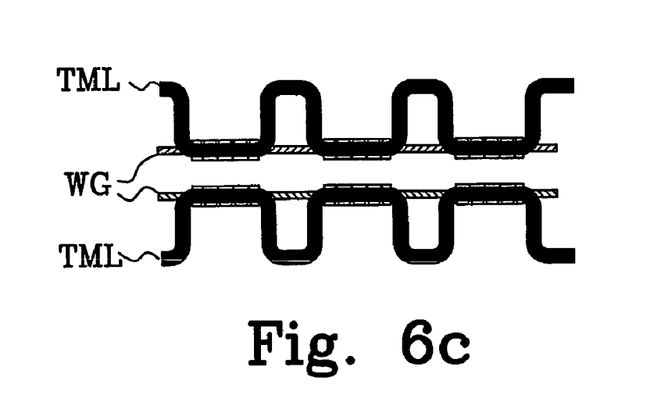

FIG. 5a shows a segmented implementation of the invention, whereas FIGS. 5b to 5f show semi-segmented implementations of the invention. FIGS. 5b and 5d show a three section modulator and FIG. 5c a two section modulator. FIG. 5e show an example of impedance tapered transmission line by varying the length of the passive TML, and by varying the modulator length shown in FIG. 5f. The implementation may also consist of two parallel optical waveguides to form an electro-optic Mach-Zehnder modulator, see FIGS. 6a-6c.

Therefore when the length of for the electrical wave is altered in such a way that the electrical wave is delayed by making the TML longer than the corresponding optical waveguide, this will modify equations (4) and (5) into:

$$Z_B = Z_p \frac{n_p}{n_B} \frac{l_{TML}}{l_{optical}} = Z_p \frac{\sqrt{\epsilon_{eff}}}{n_B} \frac{l_{TML}}{l_{optical}}. \tag{9}$$

An alternative expression for (3) is then given as:

$$C_m \frac{l_m}{l_{optical}} = \frac{n_B^2 - \left(n_p \frac{l_{TML}}{l_{optical}}\right)^2}{c_0 Z_B n_B} = C_{eff} \tag{10}$$

$Z_p$ can now be chosen arbitrarily (larger than the required $Z_B$) and the velocity matching is adjusted by the length ratio. There is however a penalty as a lower $Z_p$ results in a lower duty cycle between the active and the passive waveguide ($l_m/l_s$). $Z_p$ can, in one aspect of the invention, be maximized with respect to the resulting electrical loss in the structure, as this is the limitation for the device bandwidth.

EXAMPLE 3

A TML implementation, corresponding to the present invention, as a microstrip on BCB with a maximum $Z_p$ of 75Ω, using a capacitively loaded line and having $\epsilon_r$=2.7, $\epsilon_{\text{eff}}$≈2.

With $Z_B$=50Ω, then $l_{TML}/l_{optical}$=1.6 and $C_m*l_m/l_s$=130 pF/m.

A typical $C_m$ for an electroabsorption modulator (EAM) is at least 700 pF/m, hence, $l_m/l_s$<0.185.

Figure 7A:
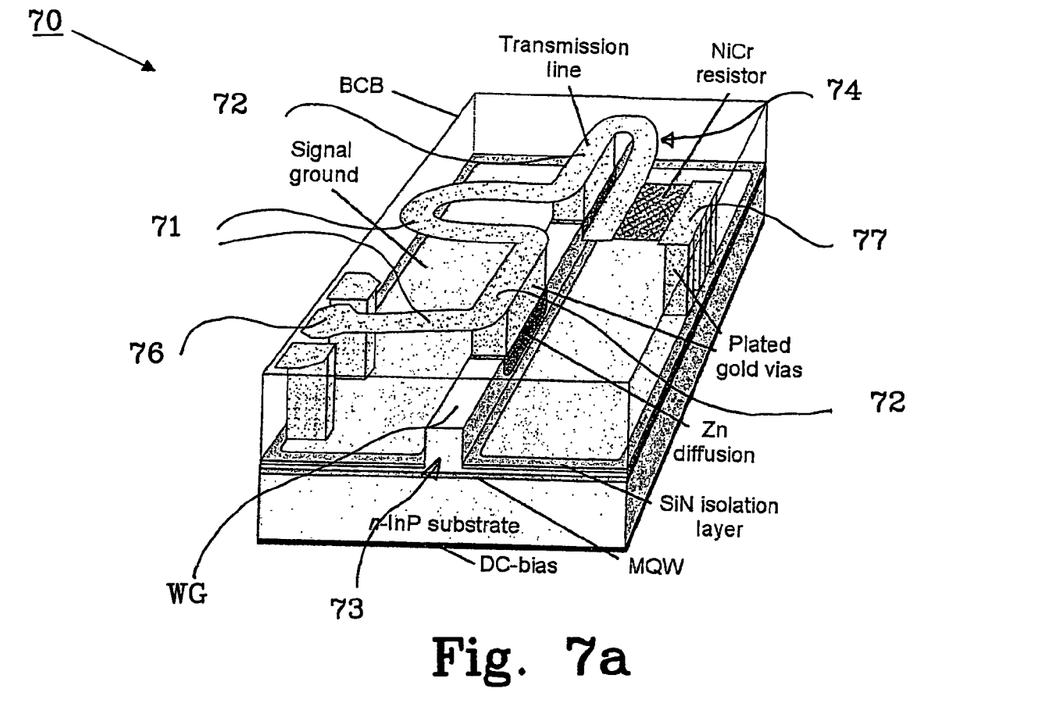
FIGS. 7a-7b show an embodiment of a segmented optical modulator according to the invention.
Figure 7B:
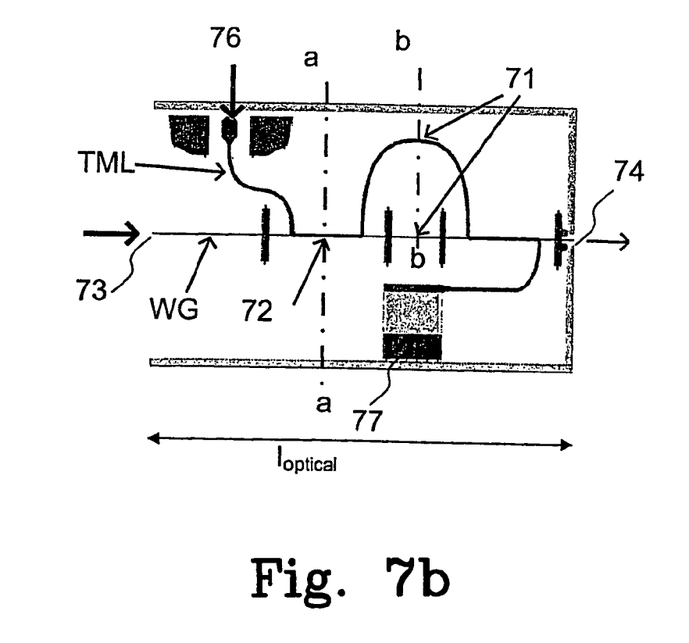

The design can be further improved by reducing the feedlines (see Walker's design) or the conductive legs (see Betts' design) to a minimum. Ideally the modulator should be an integrated part of the passive waveguide, i.e. cascaded structure as illustrated in FIGS. 7a and 7b. This results in:

$$(C_m - C_p)\frac{l_m}{l_s} = \frac{n_0^2 - \left(n_p \frac{l_{TML}}{l_{optical}}\right)^2}{c_0 Z_B n_0} = C_{\text{eff}} \quad (11)$$

There are two reasons for this:
1) The duty-cycle is improved by a ratio of $$\text{ratio} \approx \frac{C_m}{C_m - C_p} \quad (12)$$

or typically 10% for an EAM implementation, where $C_m$≈700 pF/m, $C_p$≈70 pF/m.
2) To avoid the implementation with conductive legs, which will avoid the parasitic inductance $L_s$ as previously mentioned in the disadvantages by Walker FIGS. 7a and 7b show a perspective view and a top view, respectively, of an embodiment of a segmented optical modulator 70 according to the present invention. An electrical wave, i.e. an electrical control signal, travels along a transmission line TML from the input terminal 76 to the termination terminal 77 through passive sections 71, each having an impedance $Z_p$=70-75Ω, and two active sections 72, each having an impedance $Z_m$=22Ω, distributed along the optical length $l_{optical}$ of the modulator 70. Continuous-wave light enters at 73, into an optical waveguide WG and exits at 74 as a modulated light output. On each side of the optical waveguide WG there is provided signal ground 75 where the transmission line TML is isolated from the signal ground 75 by an isolating material, e.g. BCB, and the termination terminal 77 is connected to the signal ground through the BCB.

Figure 8A:
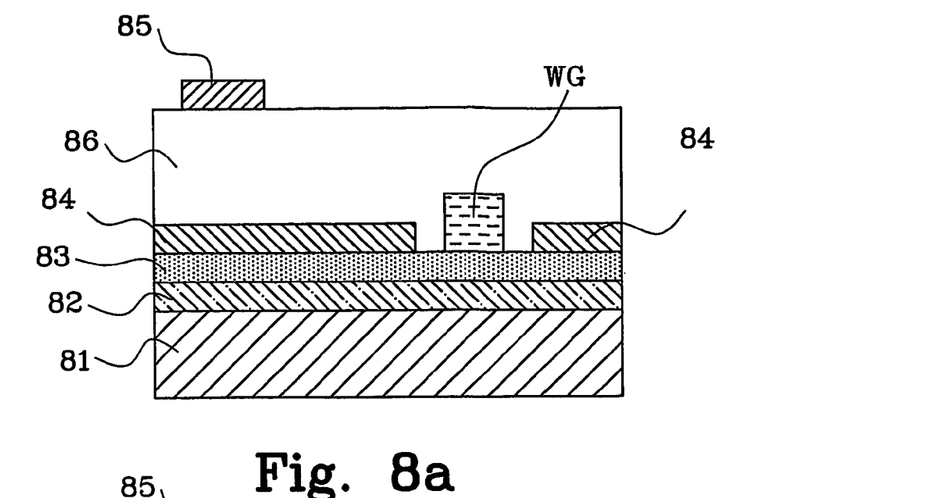
FIGS. 8a-8c show alternative cross-sectional views of the passive section of the modulator in FIGS. 7a and 7b.
Figure 9A:
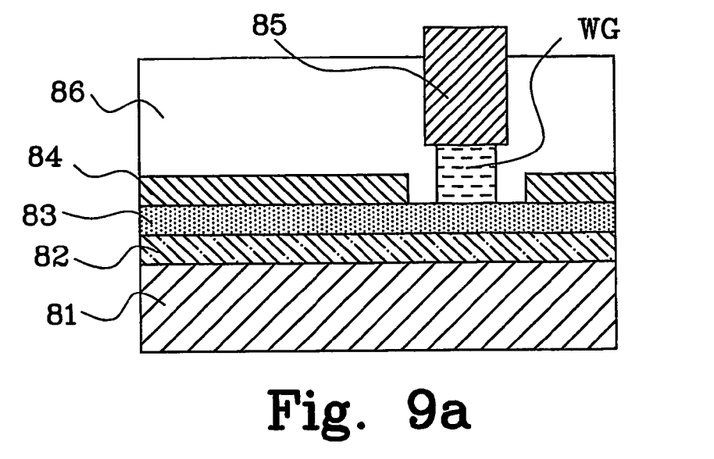
FIGS. 9a-9c show alternative cross-sectional views of the active section of the modulator in FIGS. 7a and 7b.

FIGS. 8a and 9a are cross-sectional views of a passive section 71 and an active section 72 of the embodiment illustrated in FIG. 7b along line a-a, and b-b, respectively. The device is manufactured on a substrate 81, which could be a III-IV semiconductor material, LiNbO$_3$ material or polymer material. The substrate 81 may be electrically conducting (i.e. doped) or electrically isolating (i.e. un-doped). On top of a part of the substrate 81 there may be an electrically conducting (doped) layer 82.

An active optical material 83 is thereafter arranged on top of the conducting layer 82, where the optical material properties with respect to absorption or refractive index are controlled by an external field. This could be III-IV semiconductor material, LiNbO$_3$ material or polymer material. The active optical material 83 may contain quantum wells. An optical waveguide WG is arranged on top of the active optical layer 83, and could be an etched mesa (e.g. ridge type or buried type) or doped (e.g. implanted or evaporated) waveguide. The cladding of the optical waveguide WG may be electrically conducting (doped) or electrically isolating (un-doped).

A conductive layer 84 forming the electrical ground (signal ground) is arranged beside the waveguide WG, to form a first part of the electrical transmission line TML. In FIG. 8a, an electrical electrode 85 forming part of the second part of the transmission line is arranged beside the waveguide WG and isolated from the conductive layer 84 of the signal ground by a dielectric layer 86. In FIG. 9a, an electrical electrode 85 forming the second part of the transmission line is arranged on top of, and in connection with, the waveguide WG. A dielectric layer 86 surrounds the waveguide WG and the electrical electrode 85.

The dielectric layer 86 in FIGS. 8a and 9a, could be III-IV semiconductor material or polymer material (BCB). It is usually good to choose a material with low dielectric constant ($\epsilon_r$). This layer is used to support the electrical electrode or additional electrical interconnects and pads. Part of the dielectric layer 86 could be replaced by air forming air bridges.

Reference numerals from FIGS. 8a and 9a will be reused in the following figures where appropriate, i.e. the reference numeral indicate the same type of feature.

Figure 8B:
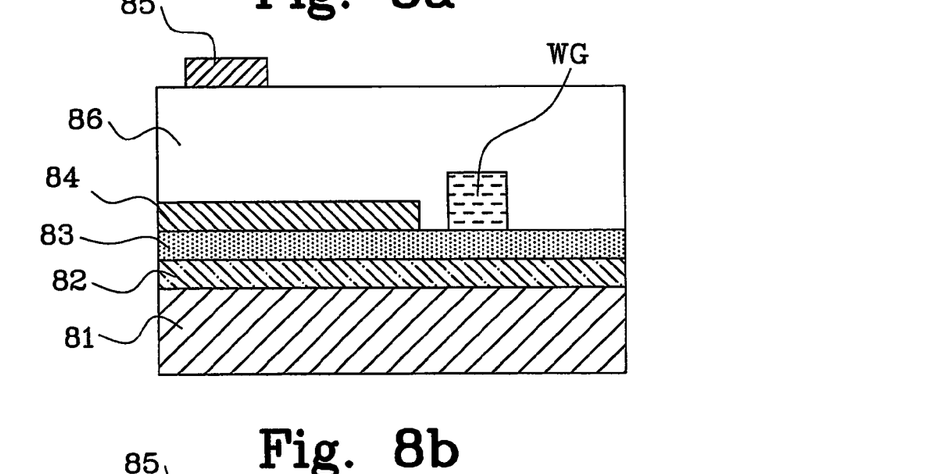
Figure 8C:
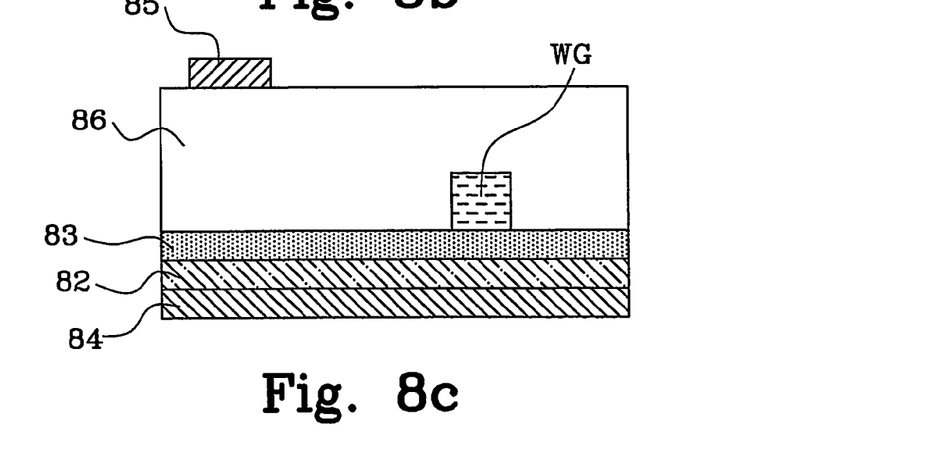

Several different implementations of the passive transmission line TML are possible, and FIGS. 8b and 8c show different variations for a microstrip transmission line. FIG. 8b show an implementation with only one ground plane and FIG. 8c could be a transferred substrate microstrip implementation with the ground plane 84 below the optical waveguide WG.

Figure 9B:
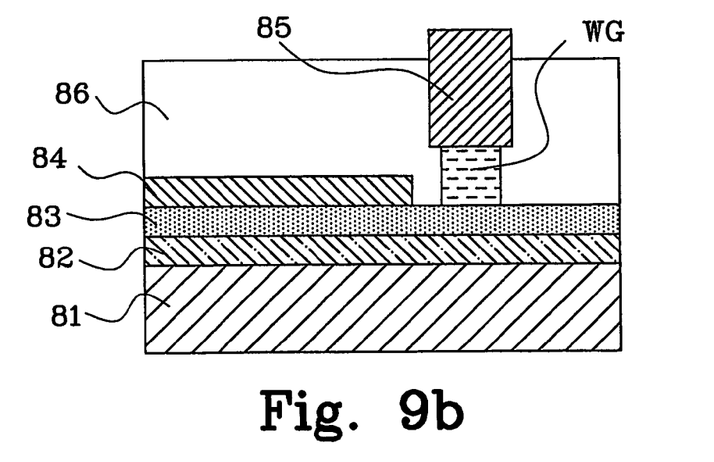
Figure 9C:
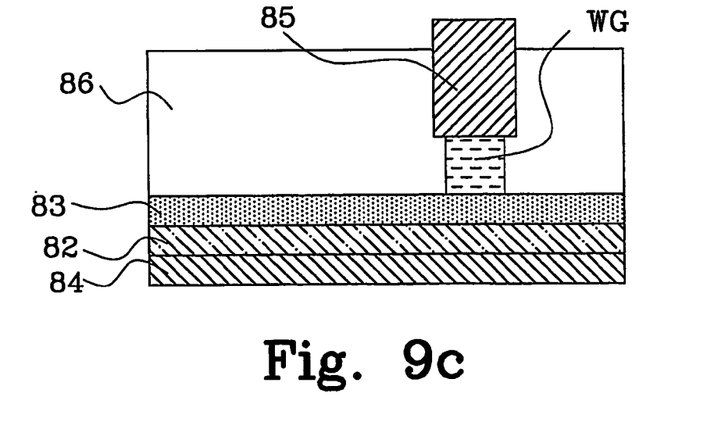

There are also a few different possible implementations regarding the active modulator segments. FIGS. 9b and 9c show different variations. FIG. 9b is an elevated co-planar transmission line with only one ground plane. FIG. 9c could be a transferred substrate microstrip waveguide type with the ground plane 84 below the optical waveguide WG.

Figure 10A:
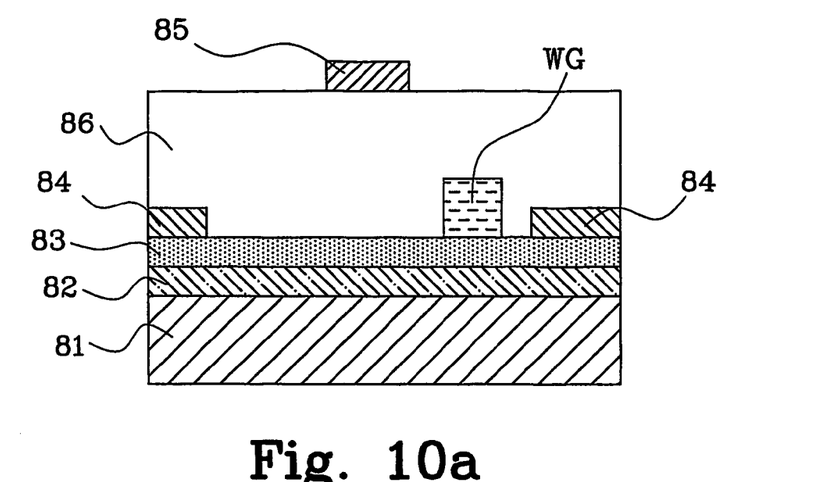
FIGS. 10a-10c show different implementations of a passive co-planar transmission line.
Figure 10B:
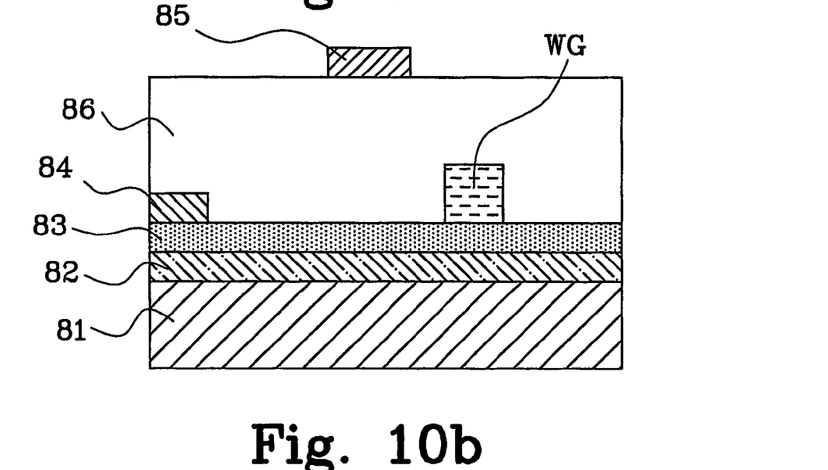
Figure 10C:
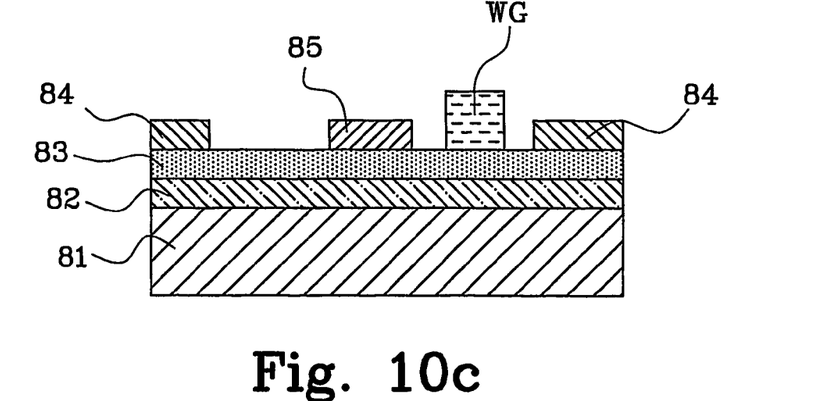

FIGS. 10a, 10b and 10c illustrates different implementations of a co-planar passive transmission line, where FIGS. 10a and 10b are elevated co-planar implementations with two, or one ground plane, respectively. FIG. 10c shows a variation with a non-elevated co-planar implementation using two ground planes.

The invention claimed is:

1. An optical modulator, divided into at least two active segments separated by at least one passive segment, the modulator comprising:
    an optical waveguide with an optical group index ($n_o$) having an optical signal propagating at an optical velocity ($v_o$), and
    a microwave transmission line with an electrical propagation index ($n_p$), having an electrical signal propagating at an electrical velocity ($V_e$), wherein the electrical propagation index ($n_p$) of the unloaded microwave transmission line is lower than the optical group index ($n_o$) of the optical waveguide, characterized in that the loading and length of the microwave transmission line are adjusted for a specific Bloch impedance and electrical velocity ($v_e$), wherein the microwave transmission line is longer than the optical waveguide.

2. An optical modulator according to claim 1, characterized in that the electrical velocity ($V_e$) in the adjusted microwave transmission line is substantially equal to the optical velocity ($v_o$) in the optical waveguide.

3. An optical modulator according to claim 1, characterized in that the length of the microwave transmission line from the center of one active segment to the center of the adjacent active segment is longer than the length of the corresponding optical waveguide from the center of one active segment to the center of the adjacent active segment.

4. An optical modulator according to claim 1, characterized in that the active segment of the optical modulator is a microwave transmission line and is cascaded in series with the microwave transmission line of the passive segment.

5. An optical modulator according to claim 1, characterized in that the optical modulator is an electro-absorption modulator.

6. A method for adapting the impedance in an optical modulator which is divided into at least two active segments separated by at least one passive segment, wherein the modulator comprises:
  an optical waveguide with an optical group index ($n_o$) having an optical signal propagating at an optical velocity ($v_o$), and
  a microwave transmission line with an electrical propagation index ($n_p$), having an electrical signal propagating at an electrical velocity ($V_e$), wherein the electrical propagation index ($n_p$) of the unloaded microwave transmission line is lower than the optical group index ($n_o$) of the optical waveguide, wherein the microwave transmission line is longer than the optical waveguide, characterized by
  adjusting the loading and length of the microwave transmission line for a specific Bloch impedance and electrical velocity ($V_e$).

7. A method according to claim 6, characterized by adjusting the loading and length of the microwave transmission line in such a way that the electrical velocity ($V_e$) in the adjusted microwave transmission line becomes substantially equal to the optical velocity ($v_o$) in the optical waveguide.

8. A method according to claim 6, characterized by adjusting the length of the microwave transmission line in such a way that the length from the center of one active segment to the center of the adjacent active segment becomes longer than the length of the corresponding optical waveguide from the center of one active segment to the center of the adjacent active segment.

9. A method according to claim 6, characterized by implementing the active segment of the optical modulator as a microwave transmission line and cascading it in series with the microwave transmission line of the passive segment.

10. A method according to claim 6, characterized by the optical modulator being an electro-absorption modulator.

11. An optical modulator having an active segment and a passive segment comprising:
  a substrate;
  an electrically conducting layer arranged on top of at least a portion of the substrate;
  an active optical layer arranged on top of at least a portion of the electrically conducting layer;
  an optical waveguide arranged on top of at least a portion of the active optical layer;
  a conductive layer forming an electrical ground arranged beside the optical waveguide, the conductive layer forming a first part of an electrical transmission line;
  an electrical electrode forming a second part of the electrical transmission line, wherein the electrical electrode is arranged on top of and in connection with the optical waveguide in the active segment.

12. The optical modulator in accordance with claim 11, wherein the electrical electrode is arranged beside the optical waveguide and isolated from the conductive layer by a dielectric layer in the passive segment.

13. The optical modulator in accordance with claim 11, wherein the substrate and/or the active optical layer are one of a III-IV semiconductor material, LiNbO$_3$ material, or a polymer material.

14. An optical modulator according to claim 1, wherein the active sections are integral parts of the optical waveguide that allow the electrical signal to propagate in the direction of optical propagation.

* * * * *